United States Patent [19]
Konieczny et al.

[11] Patent Number: 5,236,324
[45] Date of Patent: Aug. 17, 1993

[54] INJECTION MOLDING MACHINE FOR SENSING THE EJECTION OF SMALL MOLDED PARTS

[75] Inventors: Mark Konieczny; Mark Dukhon, both of Buffalo, N.Y.

[73] Assignee: Philip R. Lenard, Buffalo, N.Y.

[21] Appl. No.: 791,033

[22] Filed: Nov. 12, 1991

[51] Int. Cl.⁵ .............................................. B29C 45/40
[52] U.S. Cl. ................................. 425/139; 264/334; 425/165; 425/444; 425/556; 425/589
[58] Field of Search ................ 264/334; 425/139, 165, 425/436 RM, 444, 450.1, 451.5, 451.6, 451.9, 542, 554, 556, 589, 592, 593, 595

[56] References Cited
U.S. PATENT DOCUMENTS

| | | | |
|---|---|---|---|
| 2,854,691 | 10/1958 | Strong | 425/139 |
| 3,865,529 | 2/1975 | Guzzo | 425/438 |
| 3,905,740 | 9/1975 | Lovejoy | 425/438 |
| 4,208,176 | 6/1980 | Salerno | 425/149 |
| 4,295,815 | 10/1981 | Eltvedt | 425/444 |
| 4,655,274 | 4/1987 | Dannoura | 425/586 |
| 4,741,687 | 5/1988 | Eltvedt | 425/441 |

Primary Examiner—Tim Heitbrink
Attorney, Agent, or Firm—Howard J. Greenwald

[57] ABSTRACT

A cyclically operated injection plastic molding machine which contains a device for moving a mold insert into and out of a mold is illustrated. When the mold is closed, the mold insert is moved into it; but, before the mold is opened, the insert is removed from it. The machine also contains an electric eye device which senses the motion of a movable finger which is caused to move by the motion of an injected molded part formed by the machine.

20 Claims, 12 Drawing Sheets

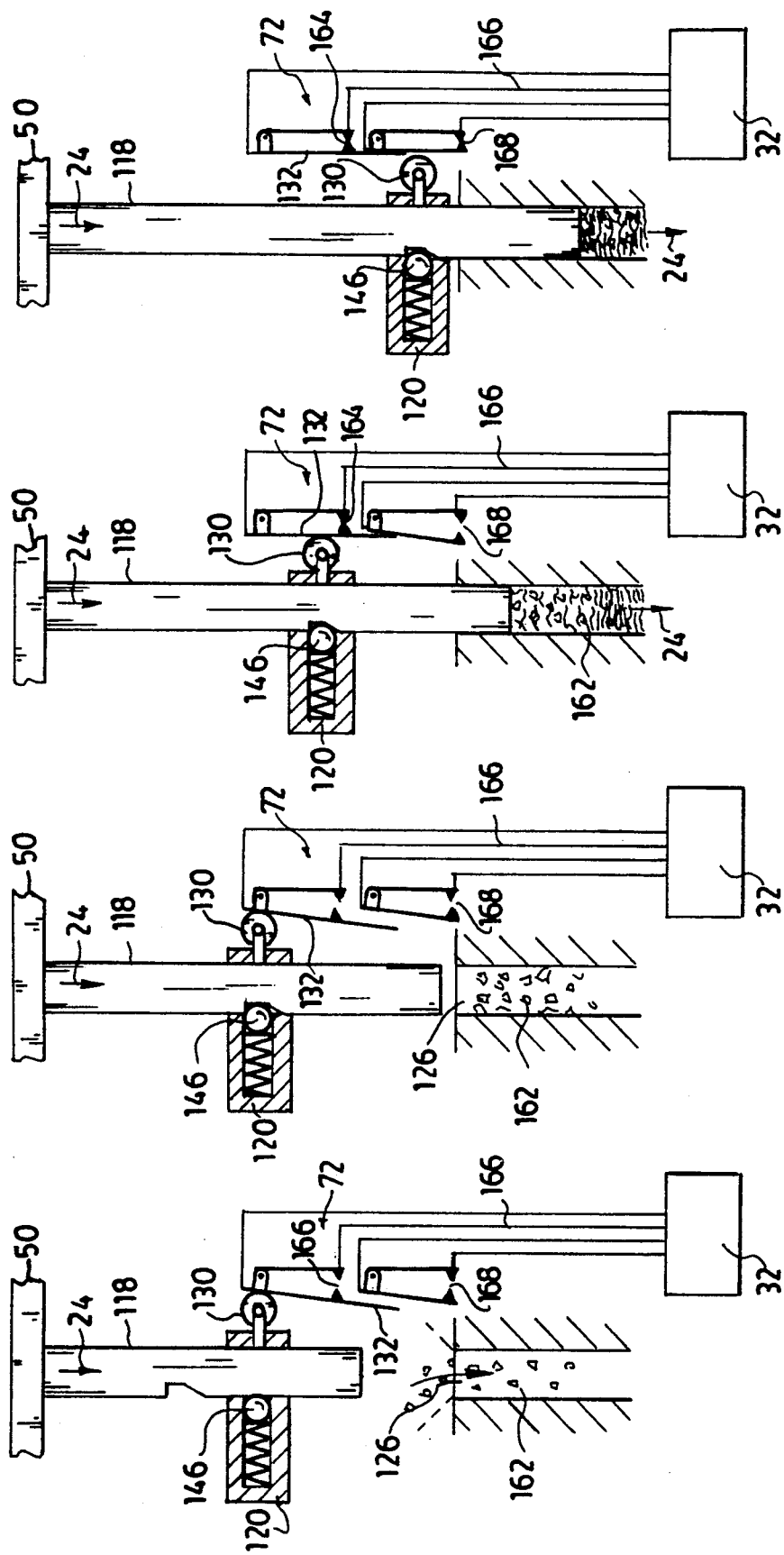

INJECTION MOLDING MACHINE FOR SENSING THE EJECTION OF SMALL MOLDED PARTS

FIELD OF THE INVENTION

An injection molding machine equipped with adjustable means for sensing the production of the molded parts is disclosed.

BACKGROUND OF THE INVENTION

Plastic injection molding machines are well known, and they generally follow a standard sequence of operations. The operation of some of these prior art injection molding machines is described below with reference to certain U.S. patents; the entire disclosure of each of these patents is hereby incorporated by reference into this specification.

As is disclosed in U.S. Pat. No. 4,208,176, in many of the prior art injection molding machines, ". . . raw plastic material is fed into a cylinder . . . it heats and plasticizes the material and forces it to the front end of the barrel. . . . When a sufficient amount of material has accumulated to produce the desired molded article and after the mold parts have been clamped together, the . . . screw is then forced forward, injecting plastic melt into the mold cavity. . . . When the part has sufficiently solidified to maintain its shape without external pressure, the holding pressure is reduced. . . . The part is then either cooled or cured in the mold, depending upon whether the plastic is thermoplastic or thermosetting. When the plastic has sufficiently solidified and the part is sufficiently formed to be ejected from the cavity, the clamp is opened and the part is then ejected."

Many injection molds for use in such prior art machines are known to those skilled in the art. These are "closed molds," that is, in their use they are closed without any material in the mold. After the application of pressure to close the mold and to hold it tightly clamped against injection pressure, molten plastic material is forced into the closed mold cavity by a source of pressure other than that which caused the mold to close.

Illustrative of some of the injection molds which have been designed for use with injection molding machines are those molds described in U.S. Pat. Nos. 3,865,529 of Guzno and 3,905,740 of Lovejoy. The Guzno patent discloses a collapsible core structure for the injection molding of plastic articles which has particular utility in the molding of polygonal enclosures having an inwardly turned flange adjacent a top opening of the article. The Lovejoy patent discloses an injection mold for the manufacture of a plastic article having four side walls and only one closed wall forming a generally rectangular enclosure with an open top.

In many of the prior art injection molding machines, the direction of mold clamping and the direction of injection are the same. However, several patents have disclosed a horizontal mold clamping and vertical injection die casting machine See, for example, U.S. Pat. No. 4,655,274 of Dannoura.

The operation of some of the prior art injection molding machines is often dependent upon some physical property of the article being molded. Thus, by way of illustration, U.S. Pat. No. 4,208,176 discloses a plastic injection molding machine comprised of means for opening its mold clamp to eject the molded part in response to parameters based upon the actual physical properties of the plastic in the mold (such as temperature, or pressure).

The molded parts produced by the injection molding machines are usually ejected from the machines and often fed to a guide skirt, which collects such parts as they are ejected and thereafter releases them. See, for example, U.S. Pat. Nos. 4,295,815 and 4,741,687.

To the best of applicants' knowledge, the prior art has not provided an injection molding machine which is compact, which is relatively inexpensive to use, which is adapted to produce small molded plastic parts, which is substantially automatic, and which is comprised of adjustable means for accurately sensing the ejection of small molded parts.

It is an object of this invention to provide an injection molding machine which is relatively compact and inexpensive.

It is another object of this invention to provide an injection molding machine in which the direction of mold clamping and the direction of injection are different.

It is yet another object of this invention to provide an injection molding machine which can utilize a flat mold plate which can readily be made out of brass bar stock.

It is yet another object of this invention to provide an injection molding machine which can utilize a flat mold plate which can readily be inserted into or removed from the machine.

It is yet another object of this invention to provide an injection molding machine comprised of a standard flat mold plate with alignment and ejector pins in it.

It is yet another object of this invention to provide an injection molding machine which is adapted to automatically sense the ejection of the injection molded part from the machine.

It is yet another object of this invention to provide an injection molding machine which is capable of operating substantially automatically and requires minimal operator attention.

SUMMARY OF THE INVENTION

In accordance with this invention, there is provided an injection molding machine comprising sensing means for determining the production of parts molded by the machine. The sensing means can be adjusted to adapt to different sized parts.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIGS. 14, 15, 16, and 17, are schematic illustrations of how the hopper feed mechanism of FIG. 10 operates in various positions;

DESCRIPTION OF THE PREFERRED EMBODIMENTS

Figure 1:
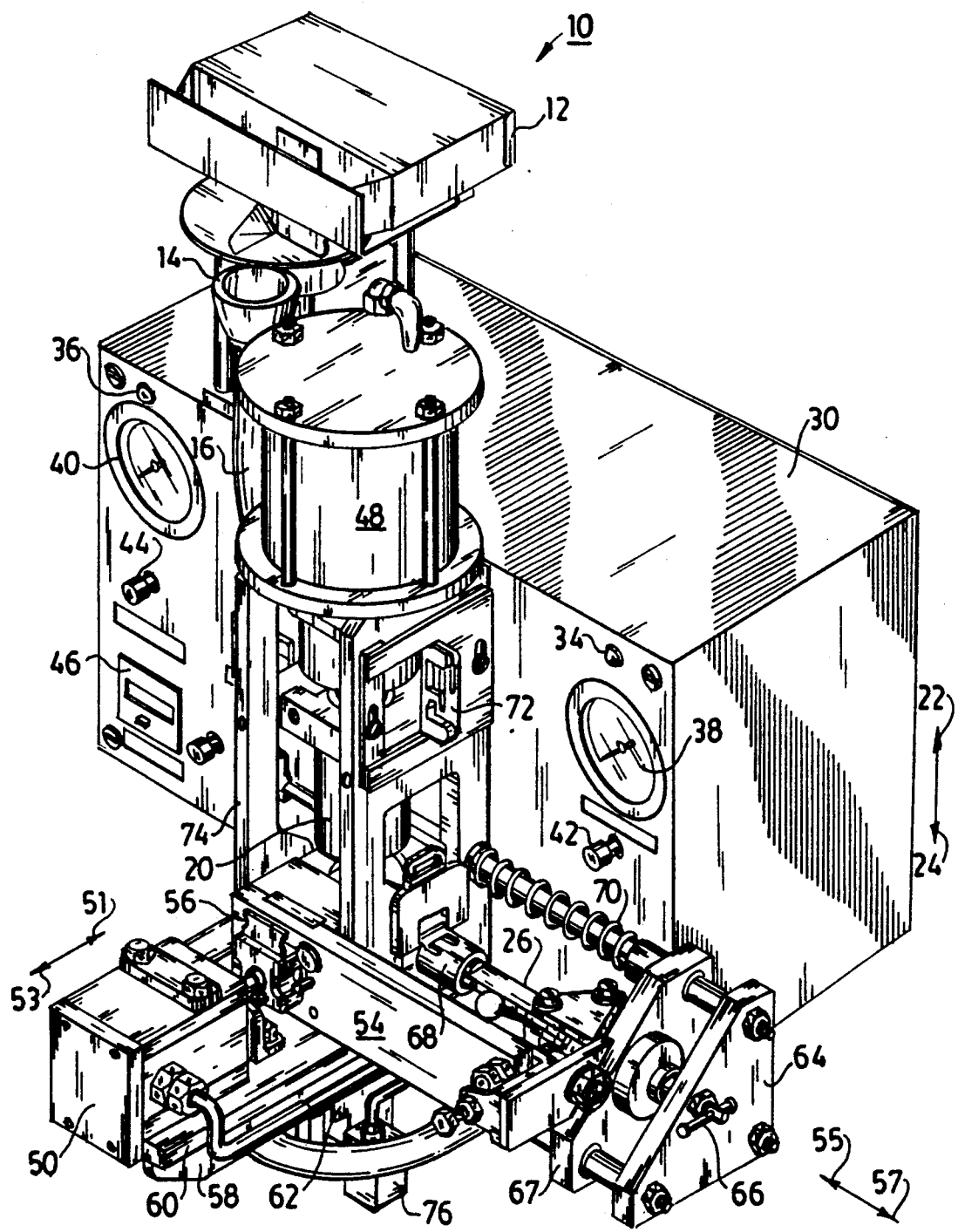
FIG. 1 is a front view of one preferred embodiment of the injection molding machine of this invention.

FIG. 1 is a front view of one preferred embodiment of applicants' invention. Referring to FIG. 1, it will be seen that injection molding machine 10 is comprised of a feed hopper 12 into which molding compound (not shown) is fed. The molding compound may be fed from hopper 12 to funnel 14 and thence through funnel 14 to feed pipe 16.

The molding material is preferably a plastic, which may be either a thermoplastic or a thermoset material. A thermoplastic material is a high polymer that softens when exposed to heat and returns to its original condition when cooled to room temperature; thus, e.g., thermoplastic materials include polyvinylchloride, nylon, fluorocarbons, linear polyethylene, polystyrene, polypropylene, cellulosic resin, acrylic resin, and the like. A thermoset material is one which solidifies or sets irreversibly when heated. Thermoset materials include phenolics, alkyds, amino resins, polyesters, epoxides, and silicones.

The molding compound flows through feed pipe 16 to a plasticizing chamber, in which it is heated; the heated material is fed through into the mold. Thus, referring to FIG. 10, it will be seen that the molding compound (not shown) flows through feed pipe 16 into container 18 and injector 20.

Referring again to FIG. 1, it will be seen that injection molding machine 10 is comprised of control box 30. Control box 30 is preferably comprised of a programmable controller (not shown in FIG. 1, but see controller 32 in FIG. 18). Control box 30 is also comprised of light 34, light 36, clamper pressure gauge 38, injector pressure gauge 40, button 42, button 44, and counter 46.

Referring again to FIG. 1, and in the preferred embodiment illustrated therein, air cylinder 48 and hydraulic cylinder 50 provide motive power for the moving parts of injection molding machine 10 and can move them in three separate directions. They can move injector 20 up and down, they can move mold part 28 (see FIG. 6) in and out, and they can move the mold insert left to right. Thus, referring to FIG. 1, it will be seen that the mold may be moved in the direction of arrows 51 and 53, the insert may be moved in the direction of arrows 55 and 57, and the injector 20 may be moved in the direction of arrows 22 and 24. Thus, the parts of this machine move in at least three different axial directions.

One preferred means for moving the mold part 28 and/or the injector is partially illustrated in FIG. 1.

Referring to FIG. 1, it will be seen that injection molding machine 10 is comprised of movable plate 54, die holder 56, channel beam 58, and cylinder mount 60. It will also be seen that injection molding machine 10 is preferably comprised of moving door 62, stationary plate 64, regulator screw 66, insert latch 68, spring 70, linkage 26, microswitch 72, frame 74, and photoelectric eye 76.

Figure 2:
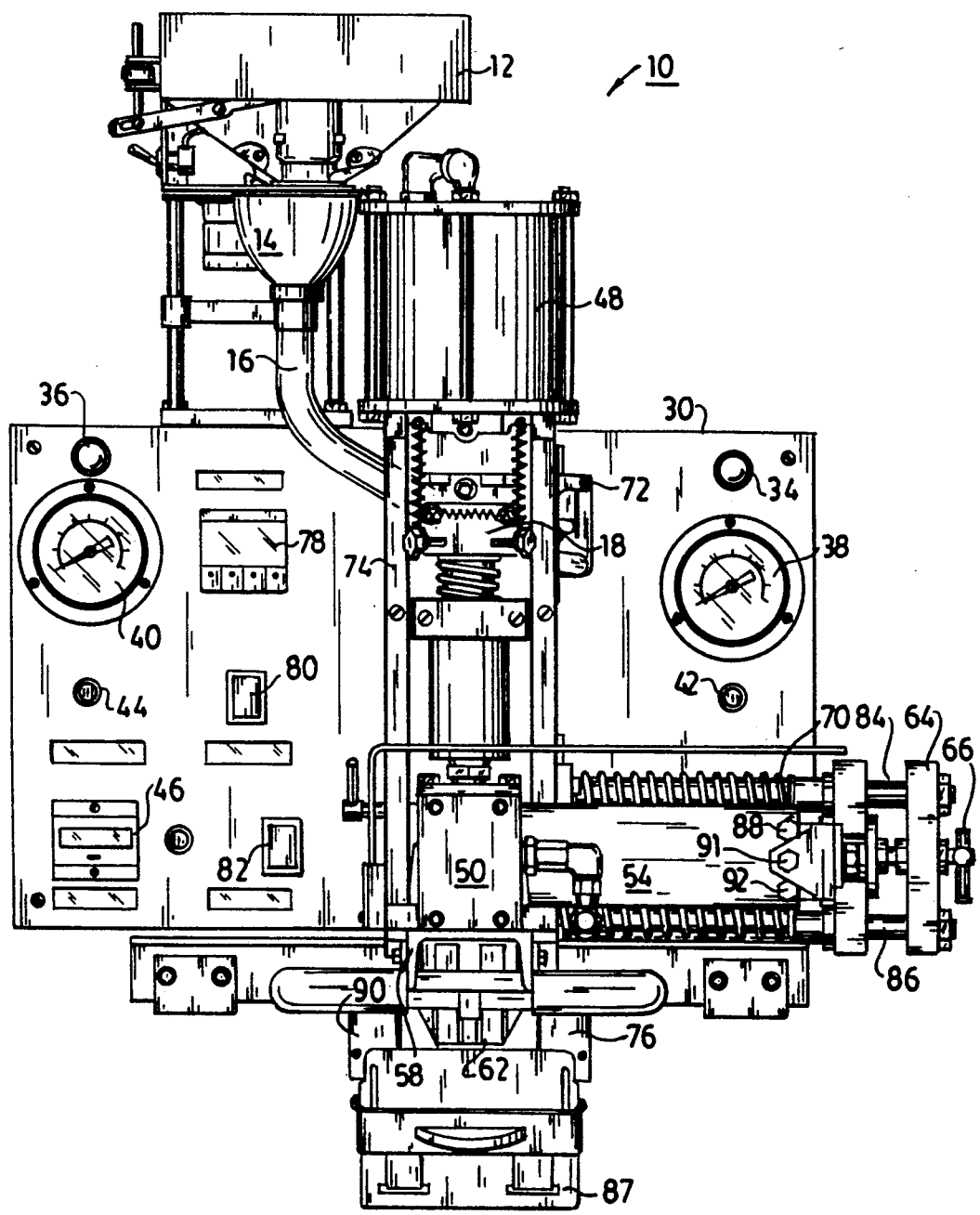
FIG. 2 is another front view of the injection molding machine of FIG. 1.

FIG. 2 is a front view of the injection molding machine 10 of FIG. 1, showing some of the components of said machine 10 in different and/or additional detail.

Referring to FIG. 2, it will be seen that control box 30 also is preferably comprised of temperature gauge 78, temperature switch 80, and off/on switch 82. It will also be seen that injection molding machine 10 is comprised of pin 84, pin 86, movement regulating screws 88, 91, and 92, bag holder 87, and photoelectric eye 76.

Figure 3:
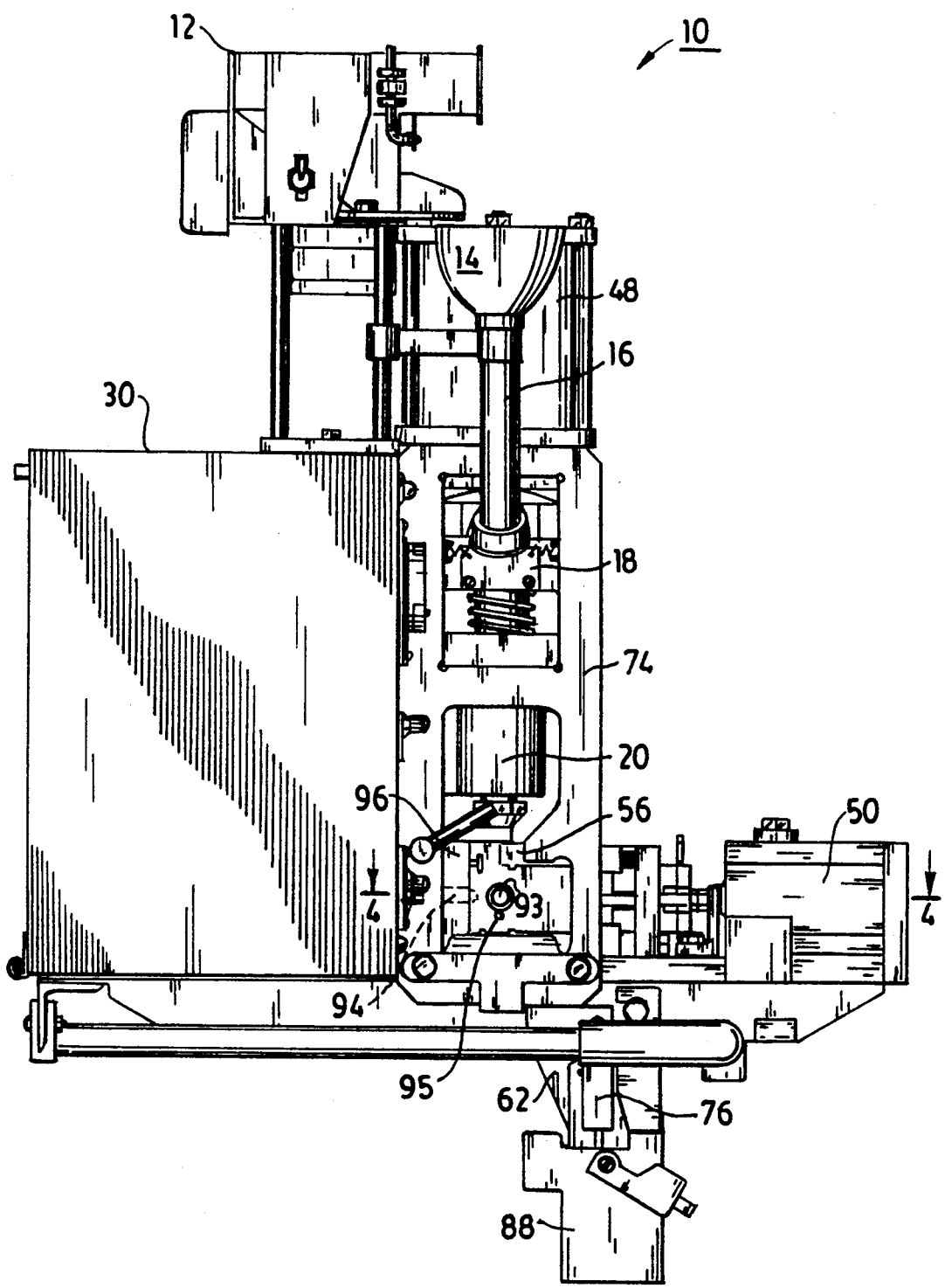
FIG. 3 is a side view of the injection molding machine of FIG. 1.

FIG. 3 is a side view of the injection molding machine 10 of FIG. 1, illustrating said machine 10. Referring to FIG. 3, it will be seen that injection molding machine 10 is comprised of mold pusher 95, fixator/catcher 94, and stationary half 96 of the die holder.

Figure 4:
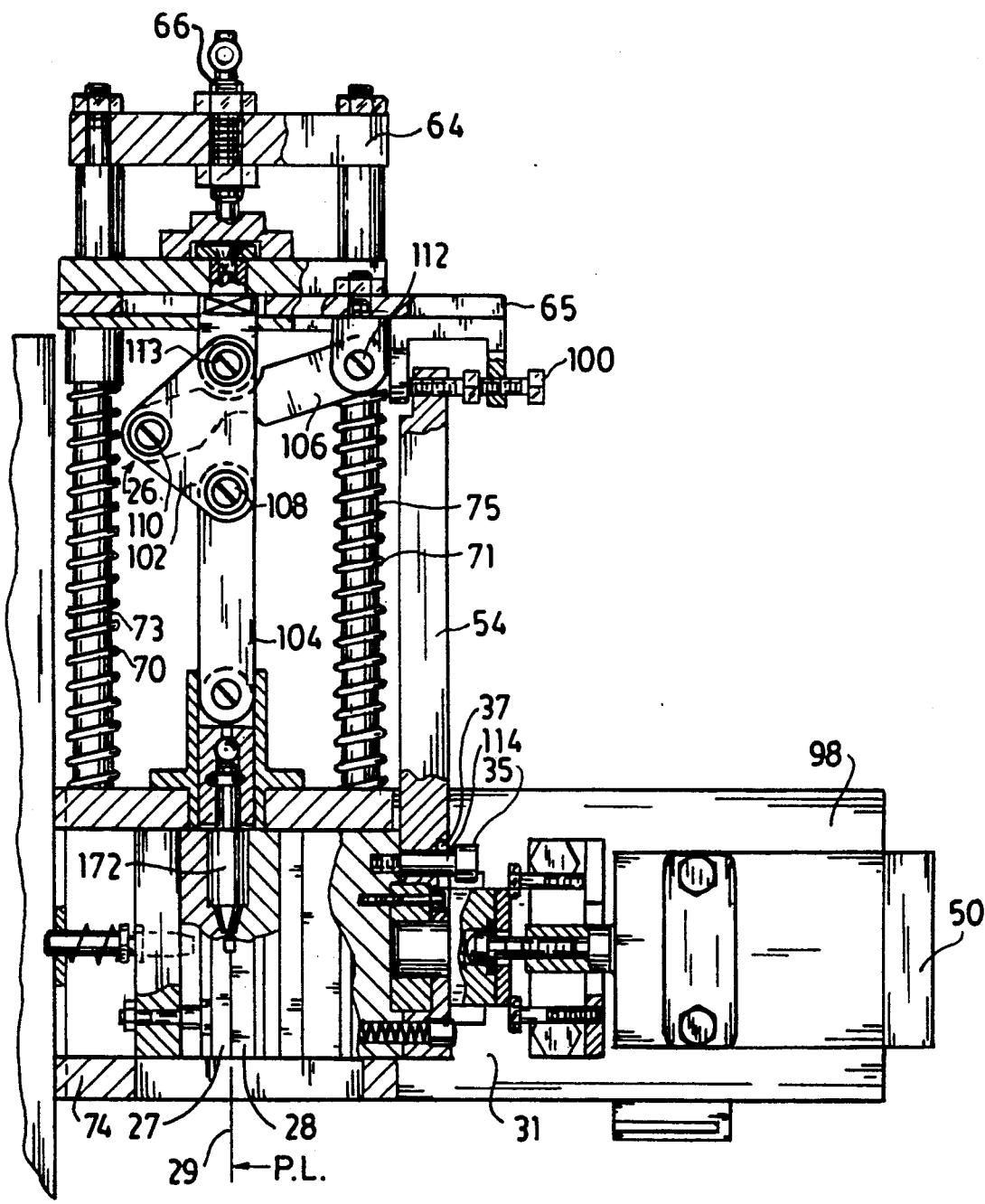
FIGS. 4, 5, and 6 is a top view of the insert movement mechanism of the injection molding machine of FIG. 1.

FIG. 4 is a top view of a portion of the injection molding machine 10, illustrating a preferred embodiment of its insert movement mechanism. Some components of molding machine 10 are illustrated in additional and/or different detail in this Figure.

Figure 5:
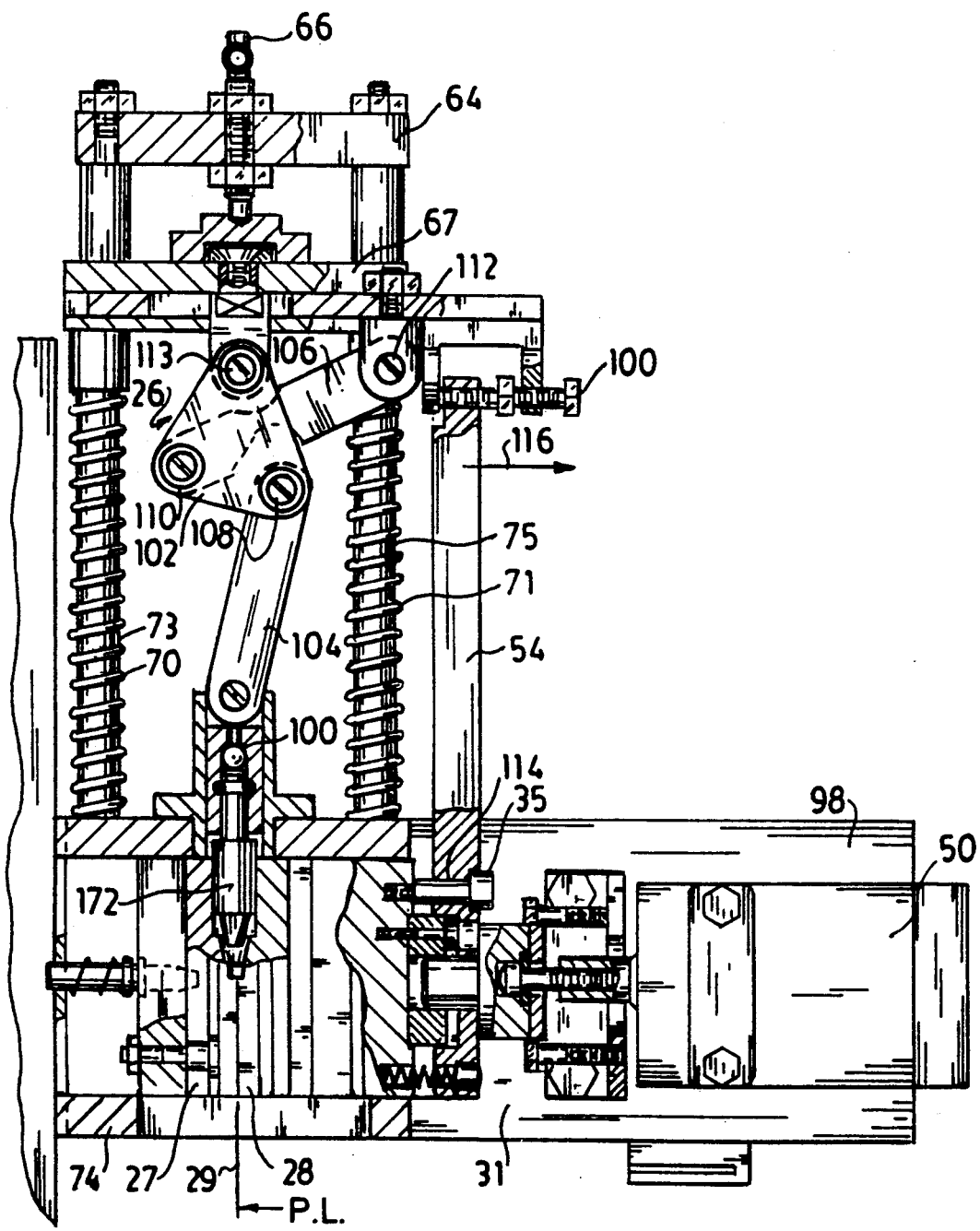
Figure 6:
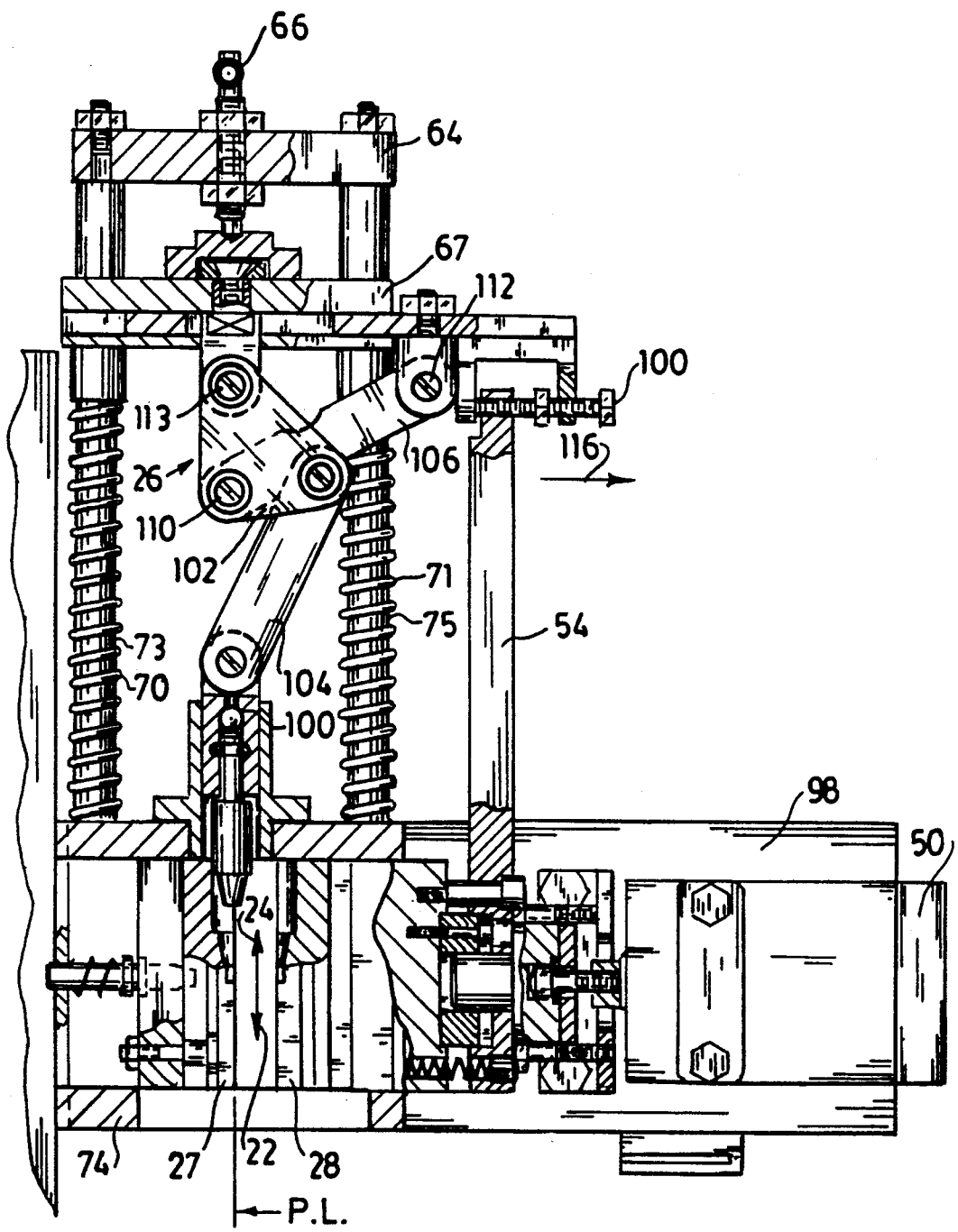

Referring to FIGS. 4, 5, and 6, it will be seen that injection molding machine 10 is comprised of a means for moving a mold insert 172 into and out of the mold while causing the mold to open and close in conjunction with the insert movement. In the embodiment illustrated in these Figures, it is essential that the insert move into the mold simultaneously with the closing of the mold halves 27 and 28. It is also essential, in this embodiment, that the insert move out of the mold, after plastic injection, before the mold halves are parted. This sequence of movement is required so as not to tear, or otherwise damage, the freshly molded part during the ejection sequence of the molding cycle.

Referring again to FIGS. 4, 5, and 6, it will be seen that the mold is comprised of stationary mold half 27, and movable mold half 28, which meet at parting line 29. By means of a suitable connection 31, the movable mold half 28 is opened and closed against stationary half 27 by hydraulic cylinder 50. To facilitate movement of the insert at the appropriate time, as described above, a movable plate 54 is attached to connection 31 so that the plate 54 may be moved a given distance by hydraulic cylinder 50 before movement of movable mold half 28 takes place in the mold-opening sequence. To this end, a gap 114 between the head of bolt 35 and the bottom of counterbore 37 in plate 54. Bolt 35 is attached to movable mold half 28. It will thus be seen that movable plate 54 may move to the right until gap 114 is taken up, after which time the movable mold half 28 will be pulled to the right during the mold opening phase (see FIG. 4).

Referring again to FIG. 4, and in the embodiment depicted therein, it will be seen that the mold halves 27 and 28 are in the closed position and the insert 172 is fully extended into the mold, thereby allowing for the injection of molten plastic into the mold and the forming of a part.

In the situation depicted in FIG. 5, the hydraulic cylinder 50 has pulled the connecting means 31 to the right along with the attached movable plate 54. The gap 114 has been closed between the head of bolt 35 and counterbore 37. At this point, movable plate 54 has pulled slidable member 65 to the right through adjustment screws 100. This, in turn, has pulled joint 112 and link 106 to the right, thus rotating link 102 about pivot joint 113 in a counterclockwise direction. This movement, in turn, pulled link 104 upward through pivoting joint 108. The upward movement of link 104 pulled insert 172 out of the mold, as is shown in FIG. 5, without the mold halves 27 and 28 being opened.

In the situation depicted in FIG. 6, the hydraulic cylinder 50 has now pulled the movable connecting means 31 fully to the right and into the mold's fully opened position. By a continuation of the linkage movements previously described, the insert 172 is pulled still further from the mold.

It will be seen that reversal of the direction of the hydraulic cylinder actuation will result in the closing of the mold and the reinsertion of the insert into the mold, which will result in a return of the parts to the position shown in FIG. 4. At that time, the mold is again ready to receive molten plastic and to form another part.

The positioning of the insert within the mold is extremely critical, as it forms the interior configuration of the molded part along with the mold halves (which form the exterior configuration of the molded part). Since the insert is positioned after movement and a long series of interactions of linkages, pivots, movable members, slidable members, and connecting means, it is essential that the buildup of tolerances contributed these members be eliminated so that the insert will be precisely positioned in the mold.

Adjustment screws 100 allow precise positioning of slidable member 65 in relation to movable member 54, thus providing a means by which the movement of the hydraulic cylinder 50 and connecting member 31 may be translated to provide the right starting position for the travel of movable member 54.

Further adjustment for the positioning of the insert 172 is provided by the regulator screw 66. Turning this screw allows movement of plate assembly 65 in an up and down direction. Since the linkages, and ultimately the insert, are mounted on plate assembly 65, it will be seen that this adjustment means will allow accurate positioning of the insert within the mold. Pins 73 and 75 form the framework to hold the linkage members and the insert. Springs 70 and 71 provide a suitable upward pressure on the assembled parts to make a rigid assembly that still will allow for movement of component parts during adjustment.

Figure 8:
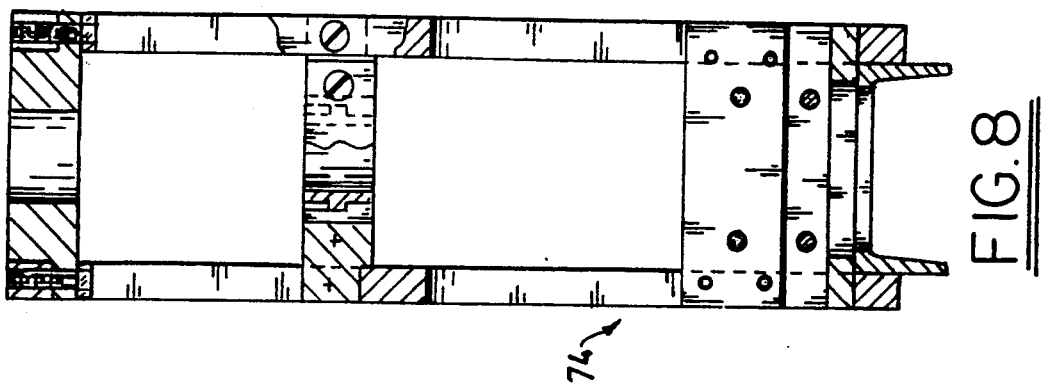
FIG. 8 is an end view of the frame of the injection molding machine of FIG. 1.
Figure 9:
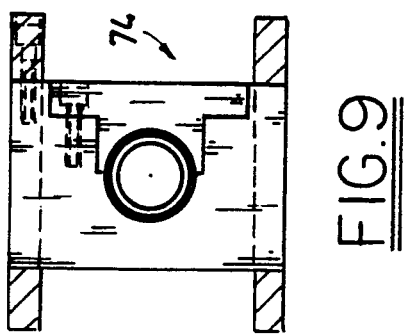
FIG. 9 is a partial sectional view of the frame of FIG. 7.
Figure 7:
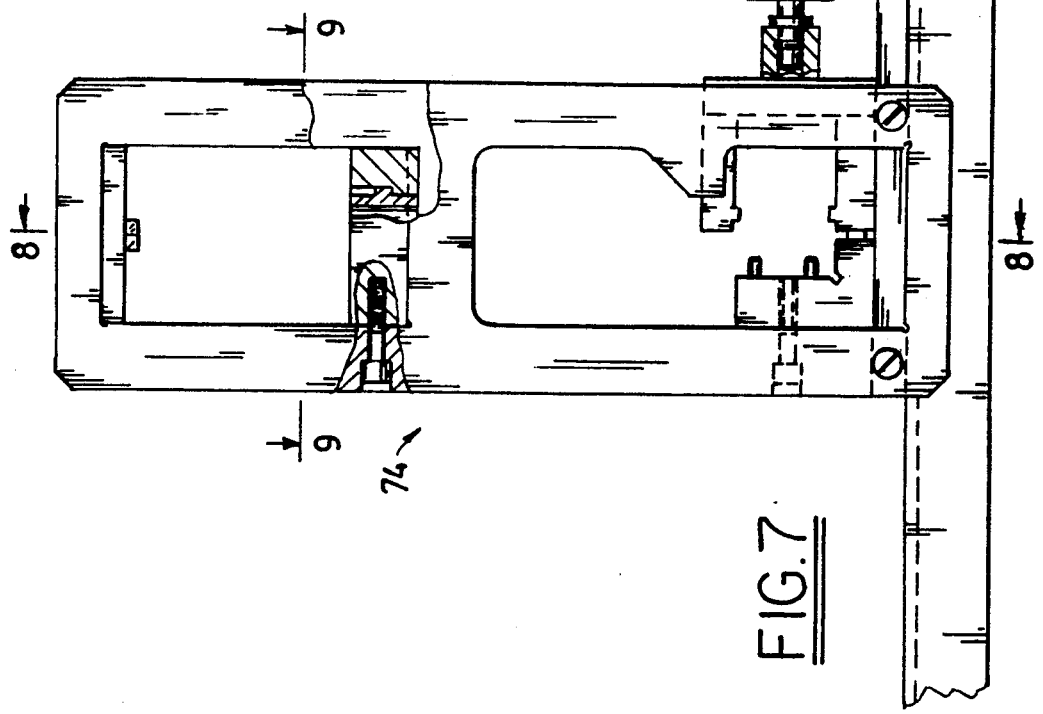
FIG. 7 is a side view of the frame of the injection molding machine of FIG. 1.

FIGS. 7, 8, and 9 illustrate a preferred frame 74 used in the injection molding machine 10 of this invention. FIG. 7 is a side view of preferred frame 74. FIG. 8 is an end view of preferred frame 74. FIG. 9 is a sectional view of frame 74, taken along lines 9—9 of FIG. 7. As will be apparent from these Figures, it will be seen that, in the preferred embodiment illustrated in these Figures, the fasteners used in frame 74 preferably are not load-bearing.

Figure 10:
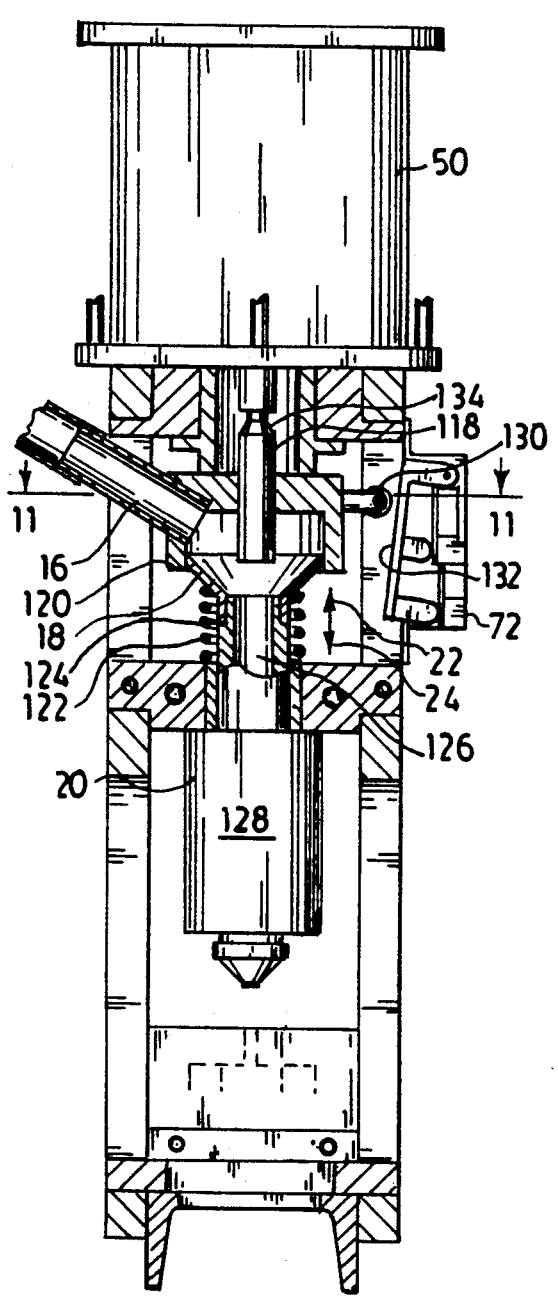
FIG. 10 is a sectional view of the hopper feed mechanism and the injector of the injection molding machine of FIG. 1.

FIG. 10 is a sectional view of a means for moving injector 20 a specified distance downwardly while simultaneously sensing how far downwardly the injector has moved.

Referring to FIG. 10, it will be seen that air cylinder 50 is connected to rod 118. Rod 118 is disposed within an orifice in platform 120.

Platform 120 is connected to container 18 which, in turn, is connected to injector 20. Injector 20 is spring-loaded. Spring 122 is disposed around narrow annular sleeve portion 124; it tends to resist movement of injector 20 in the direction of arrow 24 and to facilitate it in the direction of arrow 22.

Injection molding material (not shown in FIG. 10) may be fed from feed pipe 16 into container 18, through the passageway 126 of narrow annular sleeve portion 124 and then into the main body 128 of injector 20.

Platform 120 is attached to microswitch roller 130; and, as platform 120 is caused to move downwardly, it causes microswitch roller 130 to contact latch 132 of microswitch 72. The movement of latch 132 closes a circuit and causes information to be transmitted to programmable controller 32.

Rod 118 is comprised of detent groove 134. As rod 118 is moved downwardly in the direction of arrow 24, it is ultimately caused to be contacted with detent balls disposed within platform 120 and to be locked into place by said detent balls.

Figure 11:
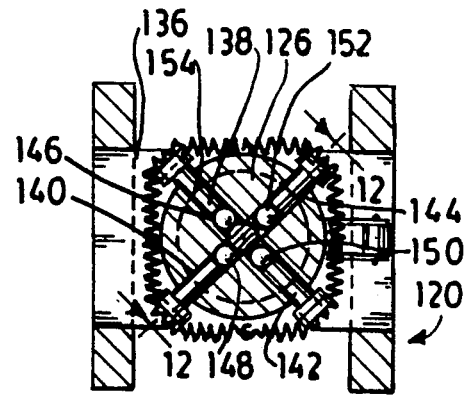
FIGS. 11, 12, and 13 are sectional views of the hopper feed mechanism of FIG. 10.

FIG. 11 is a sectional view of platform 120, taken along lines 11—11 of FIG. 10. Referring to FIG. 11, it will be seen that platform 120 is comprised of an opening 136 which communicates with the passageway 126 of annular sleeve portion 124. Disposed within opening 136 are rods 138, 140, 142, and 144 which are contiguous with detent balls 146, 148, 150, and 152, respectively. The detent balls are contiguous with rod 118, which is free to move between them until detent groove 134 is engaged by such balls. The rod--detent ball assembly is held in place by spring 154.

Figure 12:
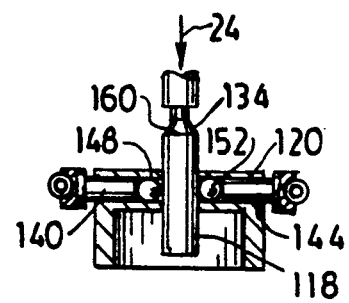

As will be seen by reference to FIG. 12, when rod 118 is pushed in the direction of arrow 24, it will be free to move between spring-loaded detent balls 148 and 152 until and unless it is engaged by said detent balls.

Figure 13:
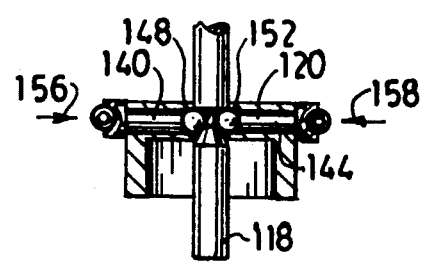

Referring to FIG. 13, it will be seen that, when rod 118 is pushed downwardly to the extent depicted in FIG. 13, detent balls 148 and 152 will move inwardly in the direction of arrows 156 and 158, respectively, and will seat themselves within detent groove 134, thereby locking rod 118 in place within opening 136 of platform 120. Thereafter, further downward movement of rod 118 will also cause platform 120 (and the injector assembly 20 to which it is attached) to move downwardly, thereby causing microswitch roller 130 to make contact with microswitch 72.

Although not shown in FIGS. 11, 12, and 13, it will be appreciated that, when air cylinder 50 ceases to push rod 118 downwardly, spring 122 will tend to pull rod 118 in the direction of arrow 22. When rod 118 is pulled upwardly, because of the presence of inclined surface 160, the detent balls 148 and 152 will disengage from detent groove 134.

FIGS. 14, 15, 16, and 17 are schematic representations depicting the movement of rod 118 and platform 120. Referring to FIG. 14, and at the beginning of the cycle, molding material 162 is fed into passageway 126 while rod 118 is pushed in the direction of arrow 24 by air cylinder 50. In the position depicted in FIG. 14, although microswitch roller 130 is contiguous with latch 132, microswitch 72 is open.

In the embodiment depicted in FIG. 15, rod 118 has been moved downwardly a sufficient extent to engage detent ball 146, and is now lockably engaged with platform 120.

Further downward movement of rod 118 is illustrated in FIG. 16. Because the rod is now lockably engaged with platform 120, such downward movement causes the platform (and its attached microswitch roller 130) to move downwardly. In the embodiment illustrated in FIG. 16, there has been sufficient downward movement to cause switch 164 to close and to send an electrical signal to controller 32 via line 166.

In the embodiment illustrated in FIG. 17, further downward movement of the microswitch roller 130 has caused switch 168 to close and has sent an electrical signal to controller 32 via line 170. This downward movement has also caused the moldable plastic material to be pushed in the direction of arrow 24 into the mold.

It will be appreciated by those skilled in the art that this arrangement allows controller 32 to sense the extent to which the moldable material has been injected and, when appropriate, to cease urging rod 118 downwardly. When rod 118 is no longer urged downwardly, the spring 122 (see FIG. 10) will tend to return to its up position (see, e.g., FIG. 14).

Figure 18:
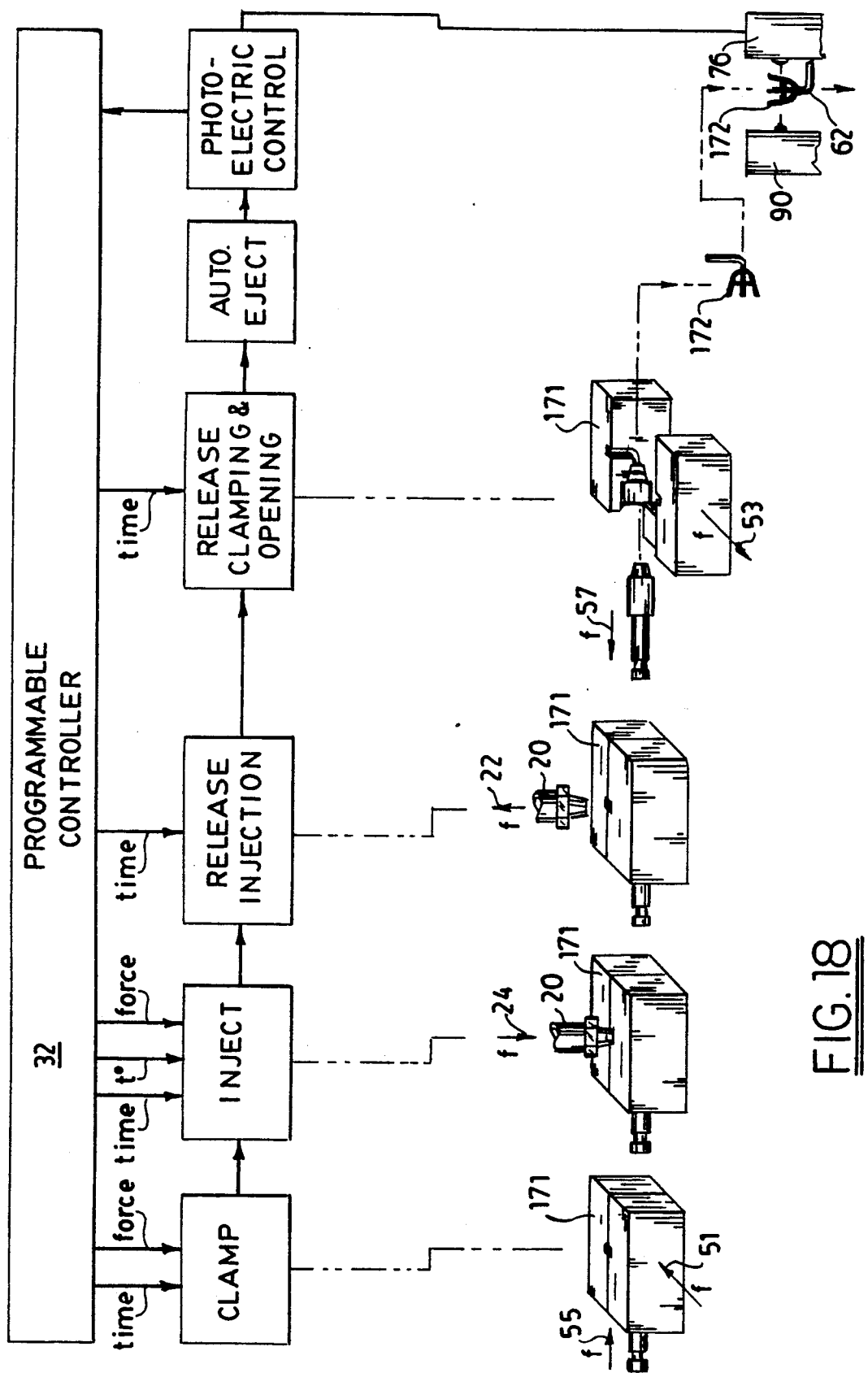
FIG. 18 is a flow sheet illustrating the operation of the injection molding machine of FIG. 1.

FIG. 18 is a flow diagram illustrating the operation of applicants' preferred injection molding machine 10.

Referring to FIG. 18, it will be seen that at the beginning of the cycle, force will be applied in the direction of arrow 51 to close mold 170 while, simultaneously, force is applied in the direction of arrow 55, to place an insert within mold 171. Thereafter, and/or simultaneously, force is applied in the direction of arrow 24 to move injector 20 downwardly and to inject moldable material within clamp 170. Thereafter, when programmable controller 32 senses that a sufficient amount of material has been injected into the mold, the downward pressure on injector 20 is released, and the injector 20 is pulled upwardly by a force created by spring 122 (not shown) in the direction of arrow 22. Thereafter, force is applied in the direction of arrow 57 to remove the insert from mold 171 while simultaneously, or thereafter, mold 171 is opened by force being applied on it in the direction of arrow 53. An injection molded plastic part 172 is then ejected from the mold and allowed to contact a movable door 62, thereby causing its movement. The movement of movable door 62 is sensed by photoelectric eyes 76 and 90, which report such movement to programmable controller 32. The programmable controller 32, in turn, may then start the next cycle when appropriate.

Figure 19:
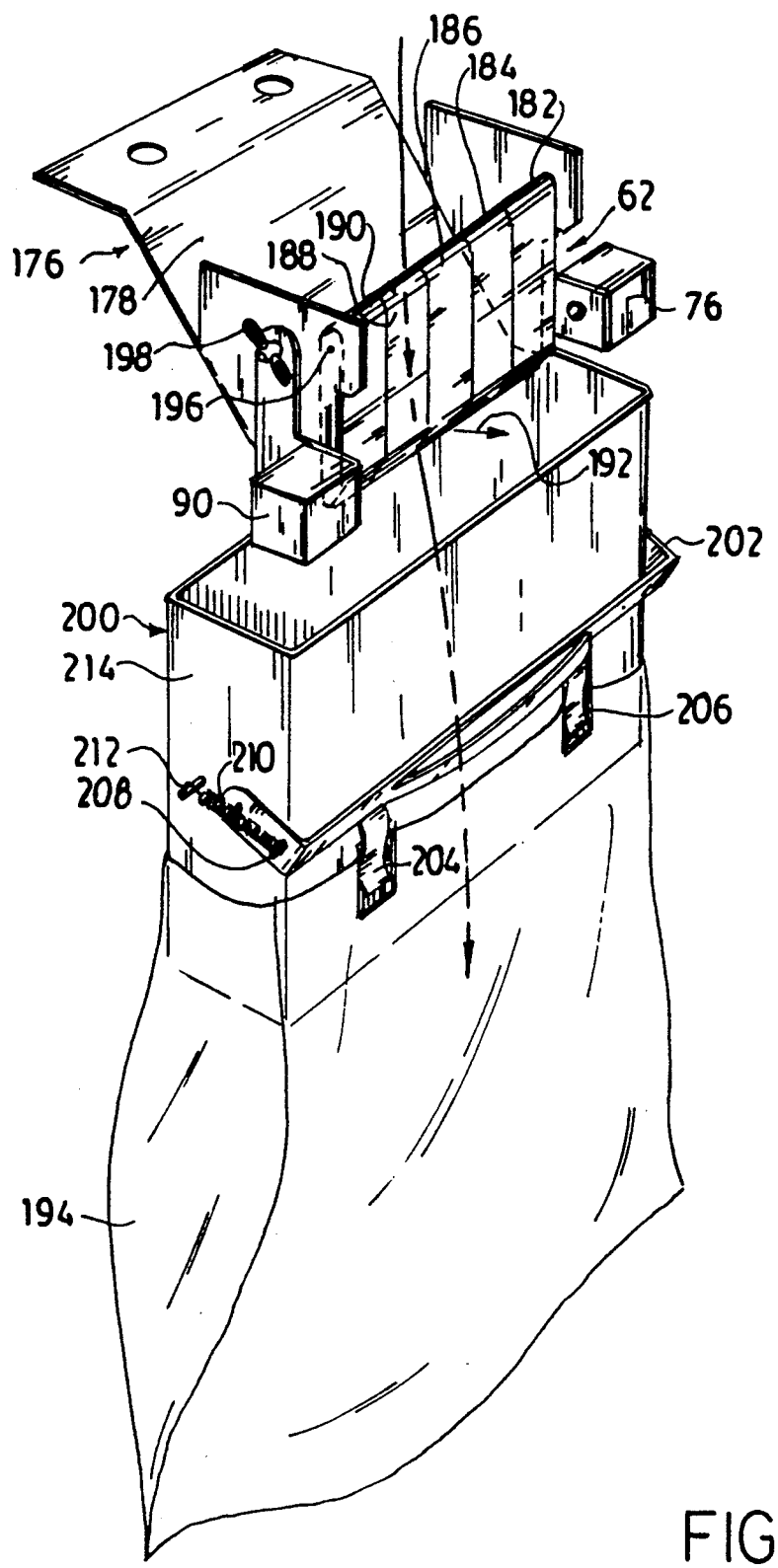
FIG. 19 is a schematic illustrating one preferred adjustable means for sensing the production of molded parts by the injection molding machine of FIG. 1.

FIG. 19 illustrates the operation of the ejection portion of injection molding machine 10. Referring to FIG. 19, it will be seen that a chute 176 may be connected to injection molding machine 10. The chute 176 contains an inclined surface 178 which provides a path for the descent of injection molded part 172.

The injection molded part 172, during its descent, will contact movable door 62. Movable door 62 is comprised of a multiplicity of movable fingers 182, 184, 186, 188, and 190. At least one of these movable fingers is adapted to be moved in the direction of arrow 192 when part 172 falls down chute 176 and into bag 194.

When very small parts, such as part 172, are being manufactured by the injection molding machine, they often will not be detected by conventional electric eyes. However, such electric eyes will detect the movement of one or more of fingers 182, 184, 186, 188, and 190.

Referring again to FIG. 19, it will be seen that electric eyes 76 and 90 will sense the movement of one or more of movable fingers 182, 184, 186, 188, and 190 when they move in the direction of arrow 192. These movable fingers are pivotally attached to chute 176 at pivot point 196. Each of electric eyes 76 and 90 are preferably pivotally attached to chute 176. Thus, referring to FIG. 19, it will be seen that electric eye 90 is pivotally attached to chute 176 by means of wing nut 198.

The molded parts which fall past one of the movable fingers pass into chute 200. Removably attached to chute 200 is plastic bag 194.

In the preferred embodiment illustrated in FIG. 19, plastic bag 194 is removably attached to chute 200 by means of a spring-loaded bag gripper bar 202. This gripper bar 202, which is comprised of grippers 204 and 206, is comprised of a pin 208 and a spring 210. The spring 210 is also attached to a pin 212, which in turn is attached to the side 214 of chute 200. A similar attachment arrangement, not shown, exists on the other side of chute 200.

Figure 20:
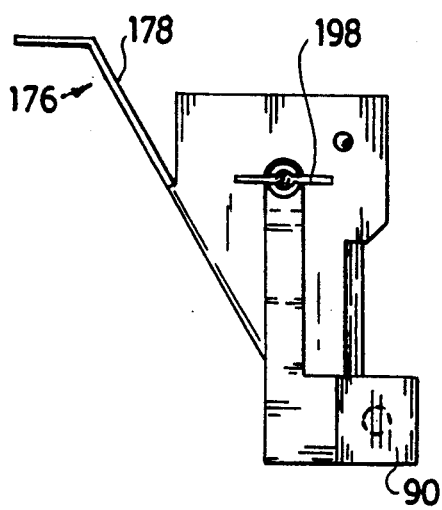
FIGS. 20, 21, 22, and 23 are views of an electric eye counting mechanism which is part of the sensing means of FIG. 19.
Figure 21:
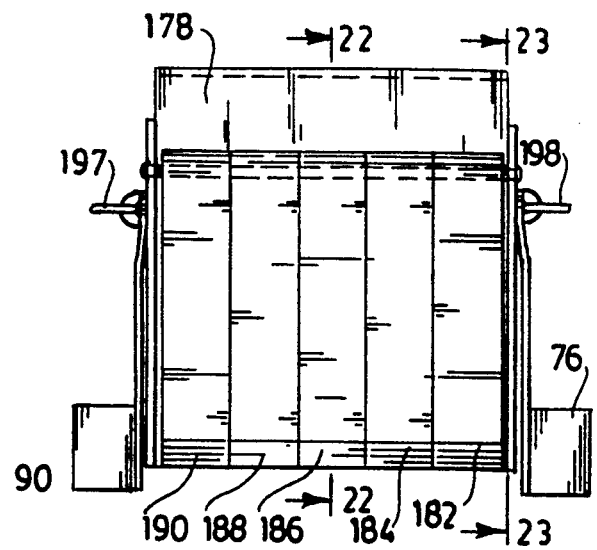
Figure 22:
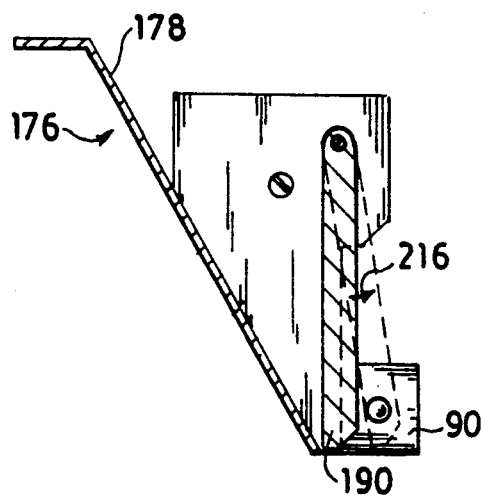
Figure 23:
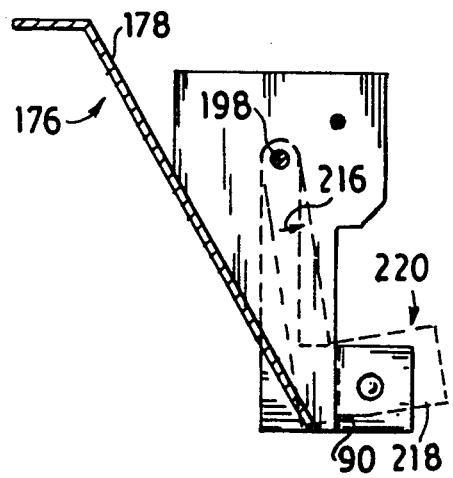

FIG. 20 is a side view of chute 176, FIG. 21 is a front view of chute 176, illustrating that wing nuts 197 and 198 are preferably used to connect both of electric eyes 90 and 76, respectively, to chute 176. FIG. 22 is a side view of chute 176, illustrating that, when movable finger 190 is contacted by an injection molded part (not shown), it moves in the direction of arrow 216 into the path of electric eye 90, which senses its movement. FIG. 23 is a side view of chute 176 illustrating that wing nut 198 may be loosened electric eye 90 may be moved from position 218 to position 220, and the wing nut 198 may then be tightened to secure the electric eye in this new position. As will be apparent to those skilled in the art, the sensitivities of electric eyes 76 and 90 may thus be adjusted to accommodate different sizes of plastic parts.

Figure 24:
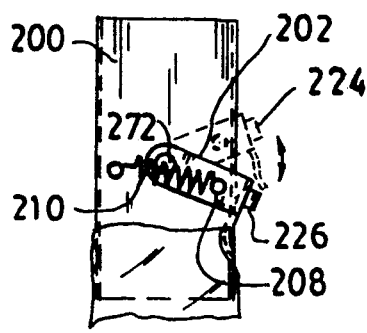
FIGS. 24 and 25 are views of a plastic bag holding means, which is part of the sensing means of FIG. 19.

FIG. 24 illustrates the operation of gripper bar 202. The gripper bar 202 is pivotally connected (at pivot point 222) to chute 200, and thus it may be pivoted from its open position 224 to its closed position 226.

Figure 25:
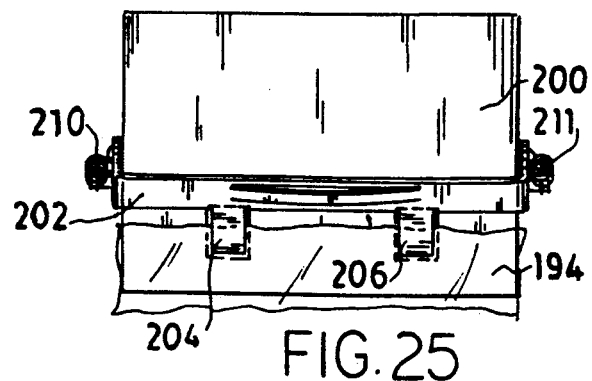

FIG. 25 illustrates that, in a manner similar to that used for the left side of gripper bar 202 (which is secured by spring 210), spring 211 may be used to secure the right side of such gripper bar.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

Thus, it will be appreciated by those skilled in the art that the injection molding machine 10 may use different means for plasticizing the molding compound and forcing it into a mold. As is disclosed, e.g., on pages 83-155 of Joel Frados' "Plastics Engineering Handbook," Fourth Edition (Van Nostrand Reinhold Company, New York, 1976), the injection unit may be use a ram or rod to force the material through the plasticizing cylinder, or it may use a screw. Thus, the machine may contain a single stage plunger, a two-stage plunger, a rotating screw, or an in-line reciprocating screw.

Thus, by way of further illustration, one may use any of several different means for opening the mold halves and for generating sufficient force to hold the mold haves closed during injection. Such means may include, e.g., (1)hydraulic clamps, in which the hyraulic cylinder operates directly upon the movable parts of the mold to open and close it, (2)toggle (or mechanical) clamps, in which the hydraulic cylinder operates through a toggle linkage to open and close the mold halves, and (3)various mechanical hydraulic clamps that combine features of both.

We claim:

1. A cyclically operated injection plastic molding machine comprised of:

(a) a container having an orifice located at one end thereof;
(b) means for feeding plastic material into said container;
(c) means for plasticizing and advancing said plastic material towards said orifice;
(d) a mold having a cavity of predetermined form, wherein said mold is comprised of a stationary mold plate and a movable mold plate, and wherein said orifice of said container communicates with said mold;
(e) means for clamping said stationary mold plate and said movable mold plate;
(f) means for unclamping said stationary mold plate and said movable mold plate;
(g) moving means for moving a mold insert into and out of said mold, wherein:
  1. said moving means moves said mold insert into said mold simultaneously with said clamping of said stationary mold plate and said movable mold plate, and
  2. said moving means removes said mold insert from said mold prior to the time said stationary mold plate and said movable mold plate are unclamped;
(h) means for ejecting a molded plastic part formed in said mold; and
(i) sensing means for sensing the ejecting of said molded plastic part, wherein said sensing means are comprised of means for guiding said molded plastic part, a multiplicity of movable fingers, means for contacting said molded plastic part with at least one of said movable fingers and causing said movable finger to move, a first means for sensing the motion of said movable finger, and a second means for sensing the motion of said movable finger.

2. The molding machine as recited in claim 1, wherein said means for plasticizing and advancing said plastic material towards said orifice is comprised of an air cylinder.

3. The molding machine as recited in claim 2, wherein said air cylinder is operatively connected to a ram.

4. The molding machine as recited in claim 1, wherein said container has a substantially cylindrical shape.

5. The molding machine as recited in claim 1, wherein said means for clamping said stationary mold plate and said movable mold plate comprises a hydraulic cylinder.

6. The molding machine as recited in claim 5, wherein said means for clamping said stationary mold is comprised of a movable plate.

7. The molding machine as recited in claim 1, wherein said molding machine is comprised of an injector.

8. The molding machine as recited in claim 7, wherein said molding machine is comprised of means for moving said injector towards said mold.

9. The molding machine as recited in claim 8, wherein said molding machine is comprised of means for sensing to what extent said injector has moved towards said mold.

10. The molding machine as recited as recited in claim 9, wherein said means for moving said injector towards said mold is comprised of a rod comprising a detent groove.

11. The molding machine as recited in claim 10, wherein said means for moving said injector towards said mold is comprised of a multiplicity of detent balls, each of which is adapted to fit within said detent groove.

12. The molding machine as recited in claim 11, wherein said means for moving said injector towards said mold is comprised of a movable platform comprising an orifice.

13. The molding machine as recited in claim 12, wherein said means for moving said injector towards said mold is comprised of means for locking said rod within said orifice of said movable platform.

14. The molding machine as recited in claim 1, wherein said sensing means for sensing the ejecting of said molded plastic part is comprised of a chute.

15. The molding machine as recited in claim 1, wherein said first means for sensing the motion of said movable finger is a first photoelectric eye.

16. The molding machine as recited in claim 15, wherein said second means for sensing the motion of said movable finger is a second photoelectric eye.

17. The molding machine as recited in claim 16, wherein said first photoelectric eye is adjustably attached to said chute.

18. The molding machine as recited in claim 17, wherein said second photoelectric eye is adjustably attached to said chute.

19. The injection molding machine recited in claim 1, wherein said molding machine is comprised of a means for removably attaching a plastic bag to said chute.

20. The injection molding machine as recited in claim 19, wherein said means for removably attaching a plastic bag to said chute is comprised of a gripper bar which is pivotally attached to said chute.

* * * * *